United States Patent
Alexander, Jr. et al.

(10) Patent No.: US 7,480,311 B2
(45) Date of Patent: *Jan. 20, 2009

(54) PORTABLE NETWORKING INTERFACE METHOD FOR DISTRIBUTED SWITCHING SYSTEM

(75) Inventors: Cedell Adam Alexander, Jr., Durham, NC (US); Loren Douglas Larsen, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/752,476

(22) Filed: May 23, 2007

(65) Prior Publication Data

US 2007/0245360 A1    Oct. 18, 2007

Related U.S. Application Data

(63) Continuation of application No. 09/513,518, filed on Feb. 25, 2000, now Pat. No. 7,346,075.

(51) Int. Cl.
*H04J 3/22* (2006.01)

(52) U.S. Cl. .................. 370/466; 370/401; 719/328

(58) Field of Classification Search ............... 370/351, 370/352, 353, 354, 355, 356, 357, 360, 392, 370/395.5, 395.52, 401, 402, 463, 465, 466, 370/467; 709/230, 238, 250; 719/328, 329

See application file for complete search history.

(56) References Cited

U.S. PATENT DOCUMENTS

| 5,307,413 | A | 4/1994 | Denzer ..................... 380/49 |
| 5,630,061 | A | 5/1997 | Richter et al. .............. 395/200 |
| 5,655,148 | A | 8/1997 | Richman et al. ........... 395/828 |
| 5,812,767 | A | 9/1998 | Desai et al. ................. 395/200 |
| 5,822,520 | A | 10/1998 | Parker ........................ 395/200 |
| 5,825,772 | A | 10/1998 | Dobbins et al. ............ 370/396 |
| 5,826,030 | A | 10/1998 | Hebert ....................... 395/200 |
| 5,839,989 | A | 11/1998 | Saito et al. .................. 477/143 |
| 5,910,954 | A | 6/1999 | Bronstein et al. .......... 370/401 |
| 5,970,069 | A | 10/1999 | Kumar et al. .............. 370/402 |
| 6,032,193 | A | 2/2000 | Sullivan ..................... 709/239 |
| 6,044,415 | A | 3/2000 | Futral et al. ................. 710/33 |
| 6,118,776 | A | 9/2000 | Berman ...................... 370/351 |
| 6,157,965 | A | 12/2000 | Mohammed et al. ......... 710/8 |
| 6,192,390 | B1 | 2/2001 | Berger et al. ............... 709/200 |

(Continued)

OTHER PUBLICATIONS

"The Open Systems Interconnect Model", available via the Internet at http://www.lebarge.com/clark/NetBasics/osidefined.htm, pp. 1-12.

(Continued)

*Primary Examiner*—Chi H. Pham
*Assistant Examiner*—Kevin Mew
(74) *Attorney, Agent, or Firm*—Joscelyn G. Cockbum; Winstead, P.C.

(57) ABSTRACT

An interface method to provide a portable networking interface for distributed switching systems. Two Application Program Interfaces (APIs) are defined for communication to a Forwarding Database Distribution Library (FDDL). The FDDL sits between network client applications and the switch device driver in order to provide a uniform interface to the switch device driver. Towers may be added to the FDDL to provide additional functionality specific to certain client applications.

2 Claims, 7 Drawing Sheets

U.S. PATENT DOCUMENTS

| | | |
|---|---|---|
| 6,202,106 B1 | 3/2001 | Baxter et al. .................. 710/22 |
| 6,314,501 B1 | 11/2001 | Gulick et al. ............... 711/153 |
| 6,445,715 B1 | 9/2002 | Annaamalai et al. ........ 370/466 |
| 6,473,803 B1 | 10/2002 | Stern et al. .................. 709/238 |
| 6,516,355 B1 | 2/2003 | Hartmann et al. ........... 709/317 |
| 6,538,996 B1 * | 3/2003 | West et al. .................. 370/238 |
| 6,907,042 B1 | 6/2005 | Oguchi ....................... 370/412 |
| 6,988,150 B2 | 1/2006 | Matters et al. ................ 710/36 |
| 7,275,103 B1 * | 9/2007 | Thrasher et al. ............. 709/224 |
| 2004/0202166 A1 | 10/2004 | Dillon ........................ 370/392 |
| 2005/0013321 A1 | 1/2005 | Jeong et al. .................. 370/466 |
| 2006/0069926 A1 * | 3/2006 | Ginter et al. ................. 713/194 |

OTHER PUBLICATIONS

Cedell Alexander, "VEGA Release 1.0 Software Functional Specification," available via the Internet at http://w3nhd.raleigh.ibm.com/mss/public/rr.html, pp. 1-79.

"Switch Node Product Description," Switch Node Software Version 1.0, BCC Version 3.0, Part No. 113487 Rev. A, May 1997, 93 pp.

* cited by examiner

PORTABLE NETWORKING INTERFACE METHOD FOR DISTRIBUTED SWITCHING SYSTEM

CROSS REFERENCE TO RELATED APPLICATIONS

The present application is a continuation application of pending U.S. patent application Ser. No. 09/513,518, which was filed on Feb. 25, 2000, which is assigned to the assignee of the present invention. The present application claims priority benefits to U.S. patent application Ser. No. 09/513,518.

TECHNICAL FIELD

The present invention relates in general to a switching system for use in a network. More particularly, the invention relates to a portable interface method and system for accessing a switch device driver from the various network services applications supported by a switch.

BACKGROUND INFORMATION

The proliferation of personal computers, digital telephones, telephony and telecommunications technology has resulted in the development of complex switches in order to efficiently communicate digital data between a number of different devices. These communication systems are generally referred to as networks. Each network operates on the basis of one or more switches which route digital data from an originating device to a destination device. To this end, communication protocols have been developed in order to standardize and streamline communications between devices and promote connectivity.

As advances are made in telecommunications and connectivity technology, additional protocols are rapidly being developed in order to improve the efficiency and interconnectivity of networking systems. As these advances occur, modifications are required to the switches in order to allow the switches to appropriately deal with the new protocols and take advantage of the new efficiencies that they offer.

Unfortunately, a switch can represent a large capital investment in a network system. The frequency in which new protocols are developed makes it impractical to upgrade switches with every protocol introduced to the market. Accordingly, what is needed is a system and device for improving interface portability within the switch so that switches can be quickly and easily upgraded and new network interface protocols can be written and supported on multiple switch fabrics.

SUMMARY OF THE INVENTION

The invention solves the problem of portability by defining two primary interfaces within the switch. The first interface is called the Forwarding Database Distribution Library (FDDL) Application Program Interface (API). The primary purpose of this interface is to allow each protocol application to distribute its database and functionality to intelligent port controllers within the switch. Such distribution facilitates hardware forwarding at the controller. Each protocol application may define a specific set of FDDL messages that are exchanged between the protocol application and the switch fabric, which passes the messages to software running at each port controller.

The second interface defined by the invention is called the Switch Services API. This interface is primarily a generic way for controlling data message flow between the ports interfaces and the switch device driver. A set of specific messages is defined to allow uniform exchange of information about the hardware status of the port as well as an interface for sending and receiving data frames. Methods to provide communications using multiple protocols are also disclosed.

The forgoing broadly outlines the features and technical advantages of the present invention in order that the detailed description of the invention that follows may be better understood. Additional features and advantages of the invention will be described hereafter, which form the basis of the claims of the invention.

BRIEF DESCRIPTION OF THE DRAWINGS

For a more complete understanding of the present invention, and the advantages thereof, reference is now made to the following descriptions taken in conjunction with the accompanied drawings, in which.

DETAILED DESCRIPTION OF THE INVENTION

In the following description, numerous specific details are set forth such as languages, operating systems, microprocessors, workstations, bus systems, networking systems, input/output (I/O) systems, etc., to provide a thorough understanding of the invention. However, it will be obvious to those skilled in the art that the present invention may be practiced without such specific details. In other instances, well-known circuits, computer equipment, network protocols, programming configurations, or wiring systems have been shown in blocked diagram form in order to not obscure the present invention in unnecessary detail. For the most part, details concerning timing considerations, specific equipment used, specific programming languages and protocols used, specific networking systems used, and the like have been omitted in as much as these details are not necessary to obtain a complete understanding of the present invention and are well within the skills of persons of ordinary skill in the art.

Figure 1:
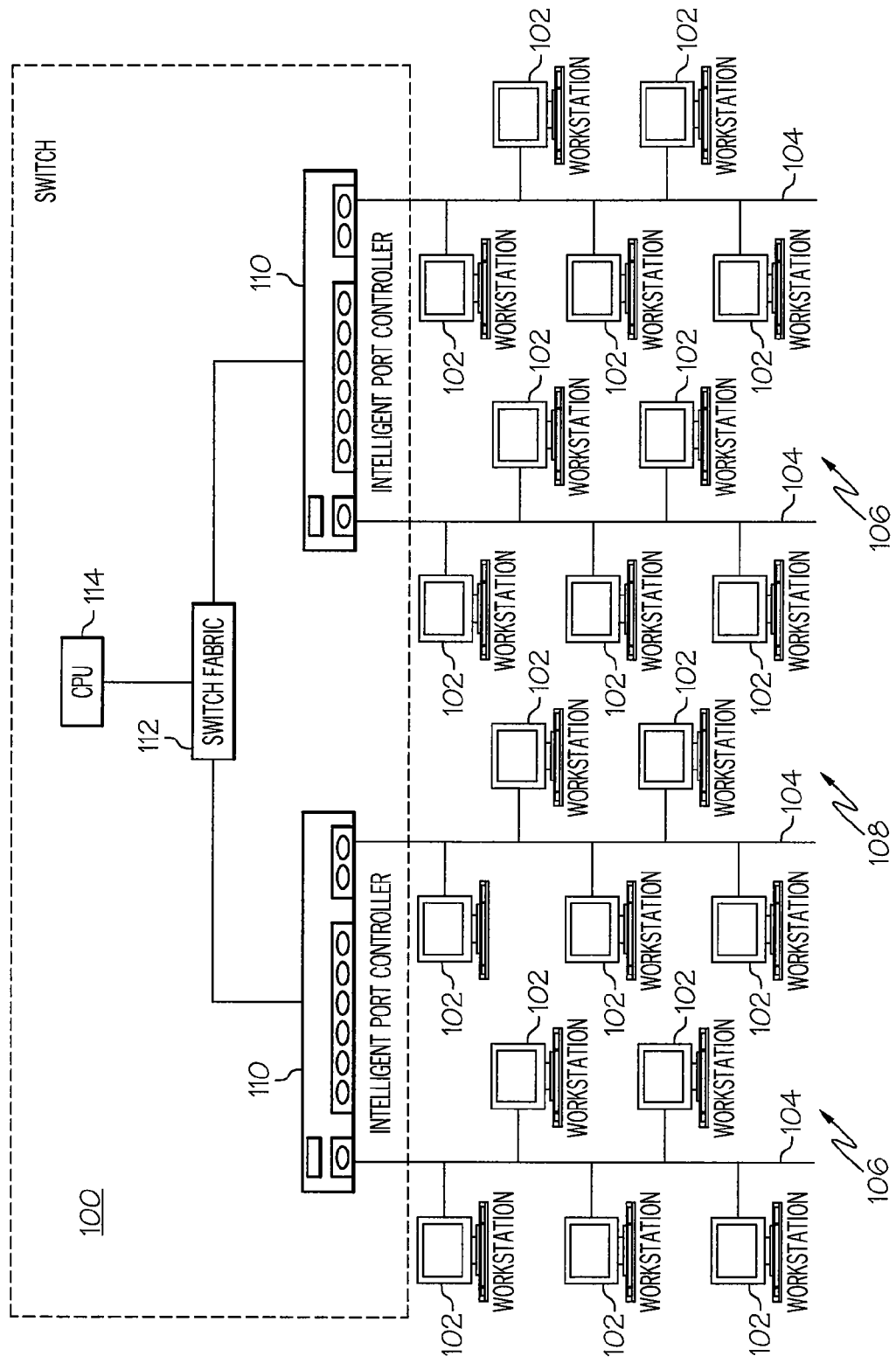
FIG. 1 is a system block diagram of a network switch, including workstations connected to the network switch.

The switch to which the present invention relates is shown with reference to FIG. 1. A network switch 100 is comprised of one or more intelligent port controllers 110, a switch fabric 112, and a central processing unit (CPU) 114. The switch 100 is connected to one or more backbones 104, which in turn are connected to one or more workstations 102. Each intelligent port controller 110 may be connected to one or more backbones 104 comprising a local area network (LAN) 106. The entire system may be referred to as a network 108.

The switch fabric 112 is comprised of one or more processors that manage a shared pool of packet/cell memory. The switch fabric 112 controls the sophisticated queuing and scheduling functions of the switch 100.

The intelligent port controller 110 provides connectivity between the switch fabric 112 and the physical layer devices, such as the backbones 104. The intelligent port controller 110 may be implemented with one or more bitstream processors.

Figure 2:
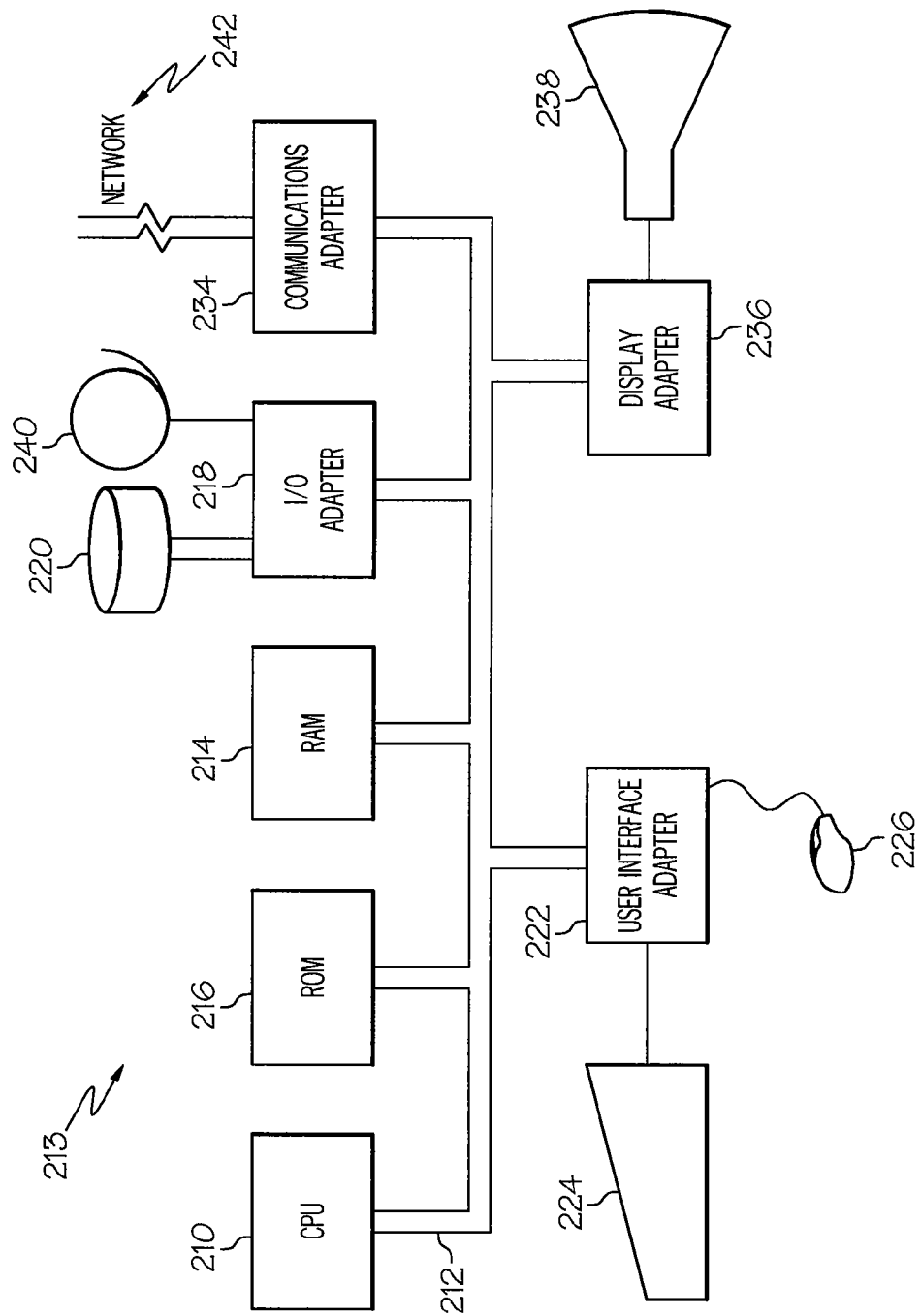
FIG. 2 is a system block diagram of a data processing system which may be used as a workstation within the present invention.

A typical workstation 102 is depicted with reference to FIG. 2, which illustrates the typical hardware configuration of workstation 213 in accordance with the subject invention. The workstation 213 includes a central processing unit (CPU) 210, such as a conventional microprocessor and a number of other units interconnected via a system bus 212. The workstation 213 may include a random access memory (RAM) 214, a read-only memory (ROM) 216, and an I/O adapter 218 for connecting peripheral devices, such as disk units 220 and tape drives 240 to the bus 212. The workstation 213 also include a user interface adapter 222 for connecting a keyboard 224, a mouse 226 and/or other user interface devices, such as a touch screen device (not shown) to the bus 212, a communication adapter 234 for connecting the workstation 213 to a network 242 (such as the one depicted on FIG. 1 at 108), and a display adapter 236 for connecting the bus 212 to a display device 238. The CPU 210 may include other circuitry not shown, which may include circuitry found within a microprocessor, e.g., execution unit, bus interface unit, arithmetic logic unit (ALU), etc. The CPU 210 may also reside on one integrated circuit (IC).

Figure 3:
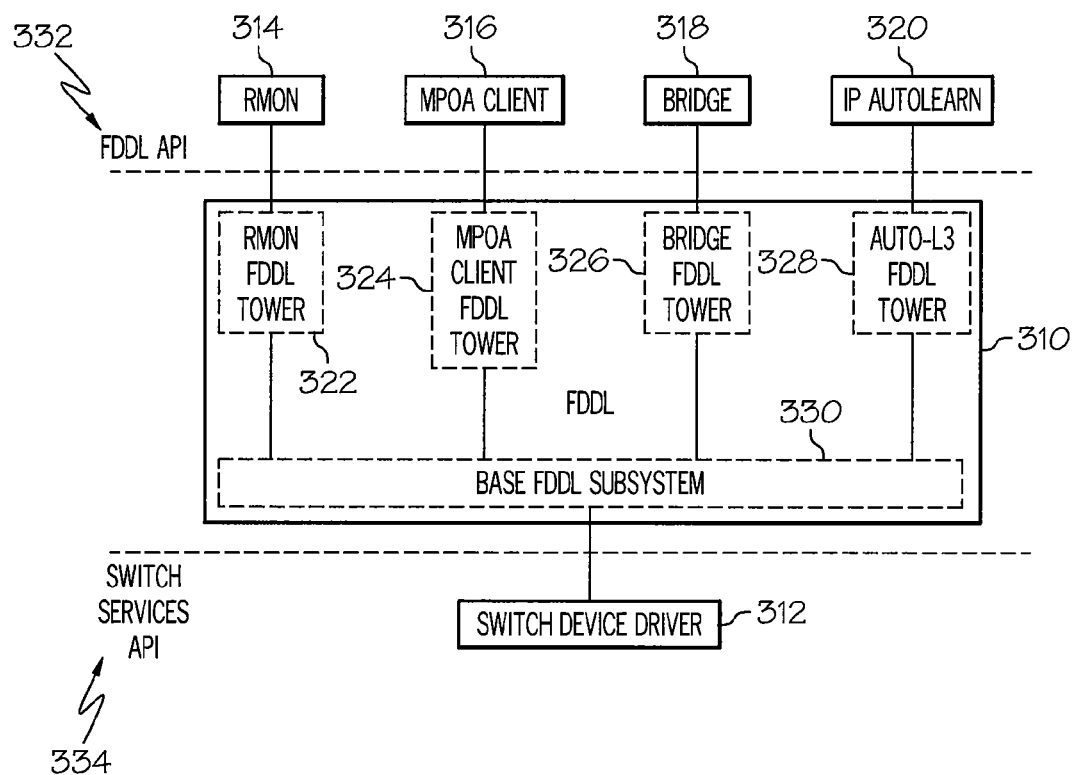
FIG. 3 is a block diagram describing the FDDL defined by the present invention and its relationship with the switch device driver and protocol drivers.

The FDDL is defined with reference to FIG. 3. The FDDL is a library which defines a set of API's designed to enable protocol forwarding functions to be distributed in a manner that is simple, efficient, and deportable. The FDDL 310 is comprised of one or more towers 322, 324, 326, 328. As depicted, a tower may be provided for remote monitoring (RMON) in an RMON FDDL tower 322. Multi Protocol Over ATM (MPOA) services may be provided through an MPOA client FDDL tower 324. Bridging services may connect through a Bridge FDDL tower 326. Internet Protocol (IP) Autolearn connectivity may be provided through an Autolearn FDDL tower 328.

Each of the FDDL towers 322, 324, 326, 328 is connected through the FDDL API 332 to its respective protocol services of the RMON application 314, the MPOA application 316, the Bridge 318, and the IP Autolearn application 320, as provided within the switch.

The FDDL 310 functions to receive commands from the various protocol components 314, 316, 318, 320 into the corresponding FDDL towers 322, 324, 326, 328. When a command is received into a tower 322, 324, 326, 328, it is passed to the base FDDL subsystem 330 for translation and passage directly to the switch device driver 312 through the Switch Services API 334.

Figure 4:
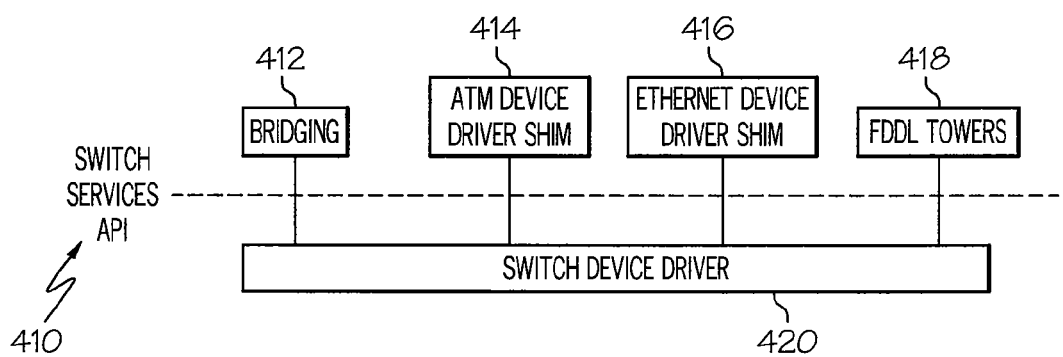
FIG. 4 is a software system block diagram of a portion of a network switch embodying the present invention which describes the relationship between the FDDL, the other services provided by the switch, and the in relation to the switch device driver.

The operation of the Switch Services API is demonstrated with reference to FIG. 4. The switch device driver 420 resides immediately below FDDL in the CPU protocol stack. As shown, there may be several users of the Switch Service API 410 which communicate with the switch device driver 420. In addition to the FDDL towers 418, other users may include an Ethernet Device Driver Shim 416 and an Asynchronous Transfer Mode (ATM) Device Driver Shim 414. The Device Driver Shims 414, 416 are interface translation agents which complete the high-level of architecture of the switch. The shims translate between the existing device driver interfaces and the Switch Services API 410 of the instant invention. In this way, translation through the shims 414, 416 allows preservation of the existing device driver interfaces from the ATM and Ethernet protocols and avoids modification of those handlers for use with the switch services API 410.

The bridging protocol application 412 may also communicate directly with the switch device driver 420 through the Switch Services API 410.

Figure 5:
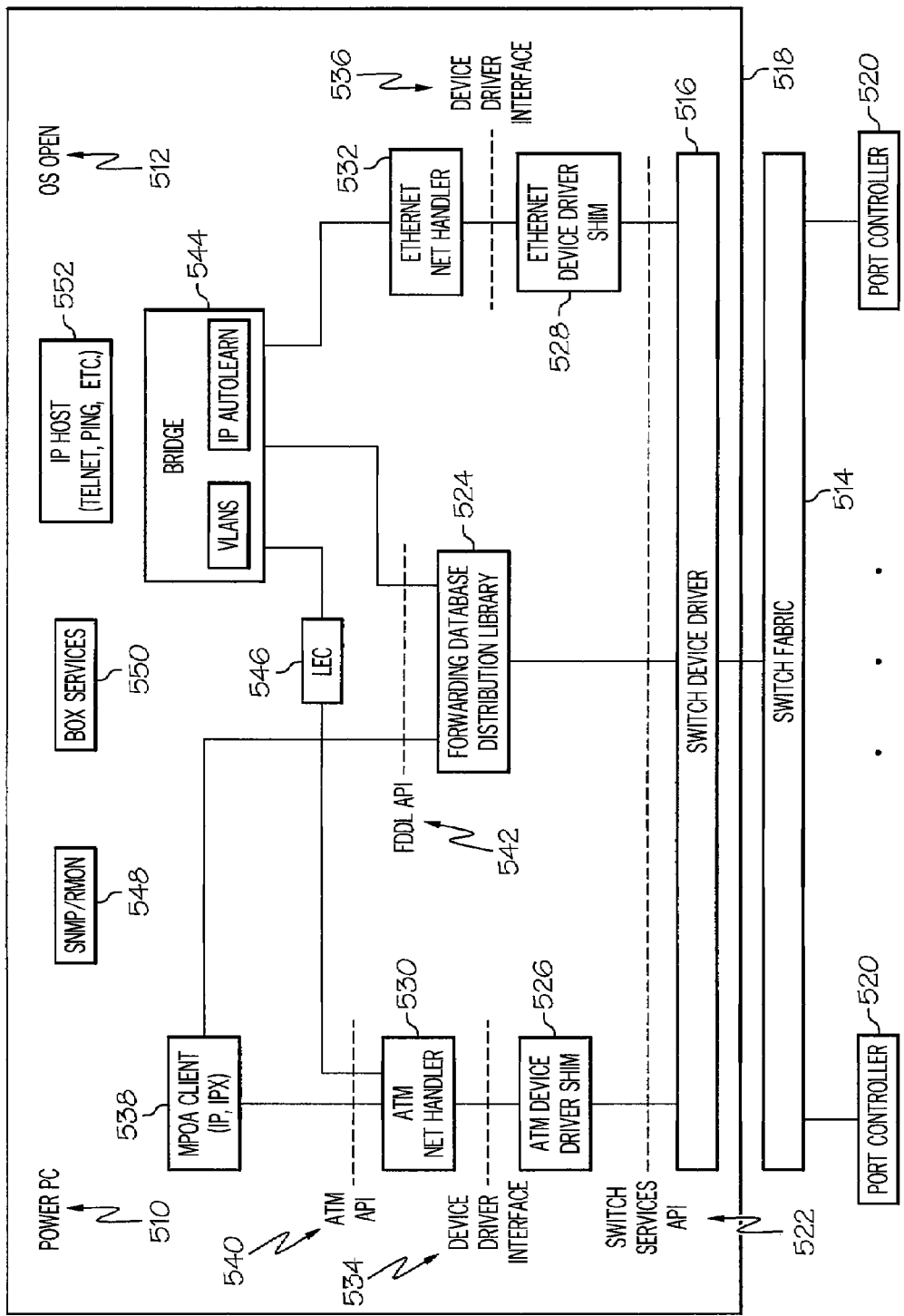
FIG. 5 is a system block diagram of the software architecture within a network switch embodying the present invention.

The architecture into which the FDDL and APIs of the instant invention fit is demonstrated with reference to FIG. 5, which is a block diagram depicting the basic software architecture of a network switch embodying the instant invention. While the software depicted is depicted as running on a Power PC processor 510 and on the OS Open real time operating system 512, those skilled in the art will appreciate that the instant invention can be practiced with a number of processors running a number of different operating systems. However, since the Power PC platform is the preferred technology for products employing many of the networking technology described, it present many advantages with regard to the architectural goals of the instant invention.

The Power PC box 518 is connected to the switch fabric 514 through the Switch Device Driver 516. In turn, the switch fabric 514 is connected to one or more port controllers 520. The Switch Device Driver 516 supports a Switch Services API 522 through which it can send and receive messages to the FDDL 524, as well as the ATM Device Driver Shim 526 and the Ethernet Device Driver Shim 528. The ATM Device Driver Shim 526 and the Ethernet Device Driver Shim 528 connect to their respective net handlers 530, 532 through device driver interfaces 534, 536.

The MPOA client 538 may communicate to the switch device driver either through the ATM API 540 or through the FDDL API 542 as defined by the FDDL 524. The bridge services 544, including the Virtual LAN (VLAN) and IP Autolearn services may be provided through the Ethernet Net Handler 532, through the FDDL API 542 to the FDDL 524, or LAN Emulation Client (LEC) 546 may be provided to communicate through the ATM API 540 to the ATM Net Handler 530.

Through the structure defined, the operating system 512 features such as Simple Network Management Protocol (SNMP) and RMON 548, other box services 550, and IP hosting services 552, such as Telnet, Ping, and other may be provided.

Figure 6:
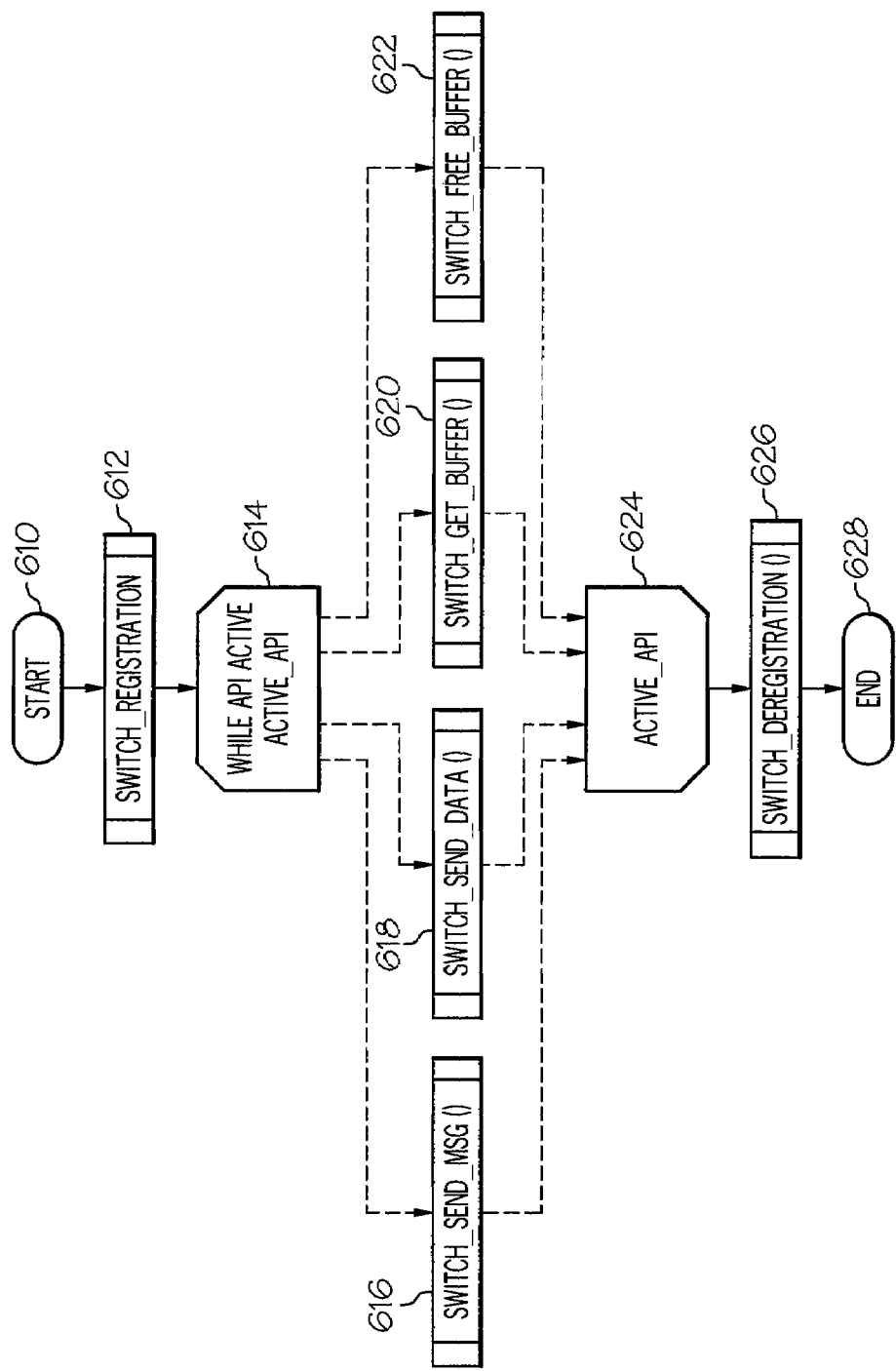
FIG. 6 is a flow chart according to ANSI/ISO Standard 5807-1985 depicting the operation of the basic primitives defined by the Switch Services API of the instant invention.

The operation of the Switch Services API 522 as provided by the switch device driver 516 is shown with reference to FIG. 6. Execution begins 610 without precondition. The API is initiated with a switch_registration( ) call 612 to register an interface user of the Switch Services API. The registration call includes parameters of a code point identifying the interface application that is registering with the API and pointers to up-call functions which may be called when messages or data frames associated with the application are received by the switch device driver to be passed through the API.

Once the switch_registration( ) called 612 is made, the API is active 614.

While the API is active, calls may be made to at least any one of four primitives, including switch_send_MSG( ) 616, switch_send_data( ) 618, switch_get_buffer( ) 620, and switch_free_buffer( ) 622.

The switch_send_MSG( ) primitive 616 is called to transmit a message to one or more registered interfaces. Messages may be sent to one interface, a group of interfaces, or broadcast to all interfaces. A message may be generally formatted using the Type-Length-Value (TLV) convention.

The switch_send_data( ) primitive 618 is called to transmit a data frame out of one or more interfaces. When a frame is to be transmitted to more than one interface, the set of destination interfaces may be specified with a bit mask or by other means well-appreciated within the art.

The switch_get_buffer( ) primitive 620 is called to allocate frame buffers. Conversely, the switch_free_buffer( ) primitive 622 is called to deallocate frame buffers.

Calls to the primitives may continue as long as the API is active 624. When an interface application wishes to disable the API, it does so by calling switch_deregistration( ) 626, which deregisters the application as a user of the switch services API. Execution of the Switch Services API then ceases 628.

Figure 7:
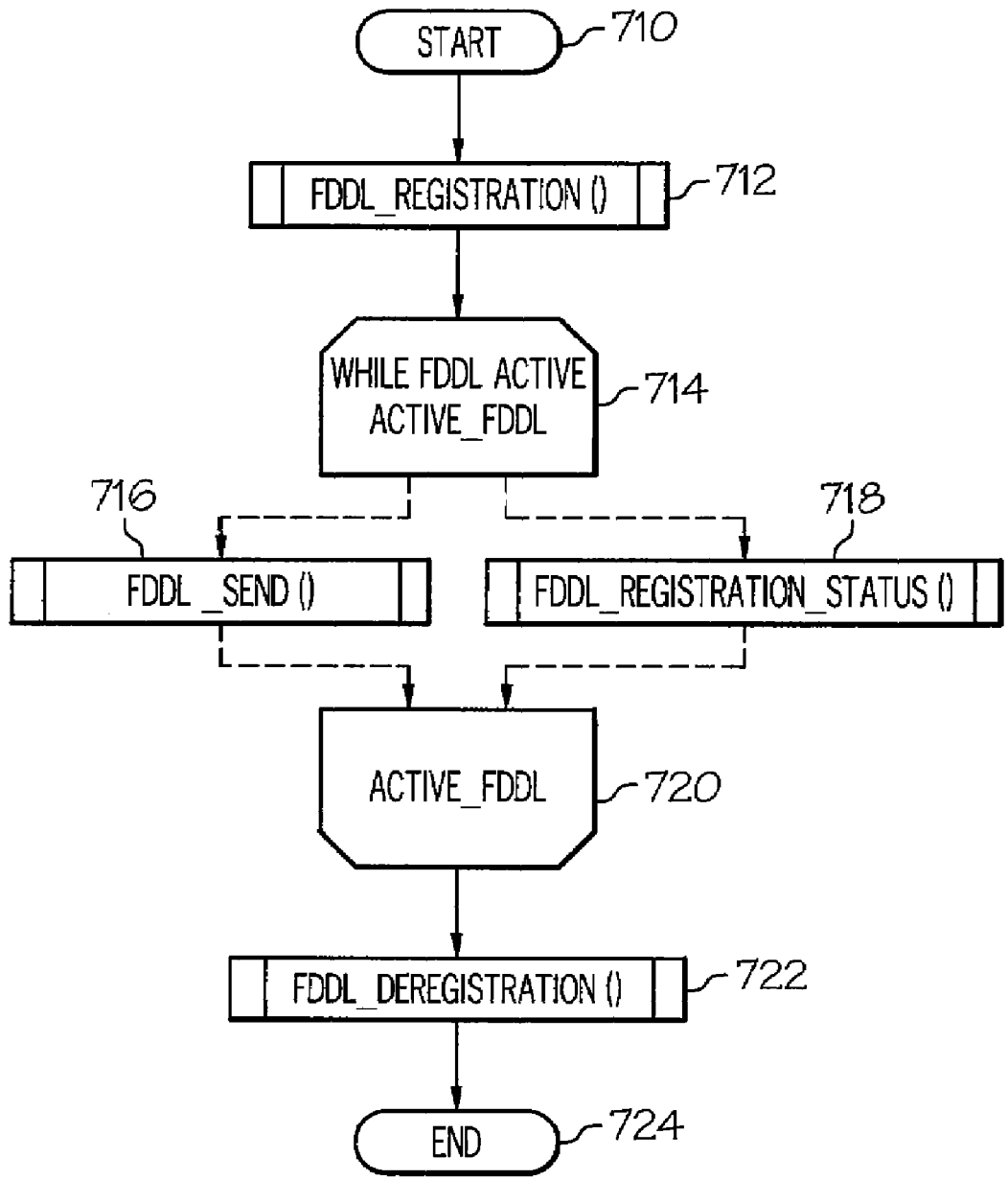
FIG. 7 is a flow chart according to ANSI/ISO Standard 5807-1985 demonstrating the operation of the FDDL API as defined by the instant invention.

The operation of the base FDDL subsystem is demonstrated with reference to FIG. 7. Execution begins 710 without pre-condition. The FDDL_registration( ) primitive 712 is called to register a client application as a user of the FDDL API. A call to the FDDL_registration( ) primitive 712 specifies a code point identifying the data base of the calling application (e.g. bridging, MPOA, etc.) and provides a pointer to a message-reception call-back function that can be invoked when messages related to the specified client are received by the API.

After the primitive FDDL_registration( ) 712 is called, the FDDL is active 714, beginning a looping process of calls.

Within the loop, the FDDL_send( ) primitive 716 may be called to initiate transmission of a message from the CPU to one or more adapters. The message may be transmitted to a single adapter or broadcast to all adapters. The FDDL_registration status( )primitive 718 may be called query whether a particular database is currently registered with the FDDL API.

When it is no longer desired for the FDDL to be active 720, the primitive_deregistration( ) 722 may be called to deregister a client application as a user of the FDDL API. Following the call to the FDDL_deregistration( ) 722, execution of the FDDL subsystem ceases 724.

It will be well appreciated by those skilled in the art that each of the FDDL towers as shown on FIG. 3, including the RMON tower 322, the MPOA tower 324, the Bridge tower 326, and the IP Autolearn tower 328 may each be optimized with primitives adapted to their respective applications 314, 316, 318, 320. Those skilled in the art will also appreciate that primitives need not be written for each tower and that additional towers may be added for client applications to be added in the future. However, the base FDDL subsystem 330 and its primitives may remain unchanged in order to provide a universal interface to the switch device driver 312.

The FDDL towers 322, 324, 326, 328 may each have its own registration processes that allow instances of its specific protocol client applications to register. Additionally, those skilled in the art will appreciate that the FDDL tower calls may be providing for other networking features well-known in the art, such as providing reliable delivery of messages, acknowledgment and non-acknowledgment schemes, Cyclic Redundancy Code (CRC) code checking, and the like.

Those skilled in the art will also appreciate that the Switch Services API need not provide for such flexibility. The Switch Device Drivers 312 are hardware dependent relying on the switch fabric (FIG. 5, 514) for their definition. As hardware will not be replaced or upgraded as easily or frequently as the client applications, the Switch Services API need not provide a towering structure.

As to the manner of operation and use of the instant invention, the same is made apparent from the foregoing discussion. With respect to the above description, it is to be realized that although embodiments of specific material, representations, primitives, languages, and network configurations are disclosed, those enabling embodiments are illustrative and the optimum relationship for the parts of the invention is to include variations in composition, form, function, and manner of operation, which are deemed readily apparent to one skilled in the art in view of this disclosure. All relevant relationships to those illustrated in the drawings in this specification are intended to be encompassed by the present invention.

Therefore, the foregoing is considered as illustrative of the principles of the invention, and since numerous modifications will occur to those skilled to those in the art, it is not desired to limit the invention to exact construction and operation shown or described, and a user my resort to all suitable modifications and equivalence, falling within the scope of the invention.

What is claimed is:

1. A method of providing communications over a network system utilizing a first protocol and a second protocol, the method comprising the steps of:
   receiving information at a port controller in a first protocol from a first node machine;
   communicating the information from the port controller in the first protocol to a switch fabric;
   communicating the information from the switch fabric to a switch device driver within an operating system;
   communicating the information from the switch device driver to a Forwarding Database Distribution Library (FDDL); and
   communicating the information from the FDDL to a first protocol client;
   wherein the FDDL allows each protocol application to distribute its database and functionality to port controllers within the switch fabric, wherein the distribution facilitates hardware forwarding at the port controllers;
   wherein said each protocol application defines a specific set of FDDL messages that are exchanged between the protocol application and the switch fabric, wherein the messages are passed to a software running at each of the port controllers.

2. The method of claim 1 further comprising the steps of:
   receiving additional information at a port controller in a second protocol from the first node machine;
   communicating the additional information from the port controller in the second protocol to the switch fabric;
   communicating the additional information from the switch fabric to the switch device driver within the operating system;
   communicating the additional information from the switch device driver to the Forwarding Database Distribution Library (FDDL); and
   communicating the additional information from the FDDL to a second protocol client.

* * * * *